US012718431B2

(12) United States Patent
Sasaki et al.

(10) Patent No.: US 12,718,431 B2
(45) Date of Patent: Aug. 25, 2026

(54) IMAGE PROCESSING SYSTEM, IMAGE PROCESSING METHOD, AND COMPUTER-READABLE MEDIUM

(71) Applicant: Evident Corporation, Tatsuno-machi (JP)

(72) Inventors: Kunihiko Sasaki, Kamiina-gun (JP); Chika Nakamoto, Kamiina-gun (JP); Yohei Kuwabara, Kamiina-gun (JP)

(73) Assignee: Evident Corporation, Nagano (JP)

( * ) Notice: Subject to any disclaimer, the term of this patent is extended or adjusted under 35 U.S.C. 154(b) by 189 days.

(21) Appl. No.: 18/891,154

(22) Filed: Sep. 20, 2024

(65) Prior Publication Data

US 2025/0111556 A1 Apr. 3, 2025

(30) Foreign Application Priority Data

Oct. 2, 2023 (JP) ................................ 2023-171096

(51) Int. Cl.
*G06T 11/10* (2026.01)
*G02B 21/00* (2006.01)

(52) U.S. Cl.
CPC ............ *G06T 11/10* (2026.01); *G02B 21/008* (2013.01); *G06T 2200/24* (2013.01)

(58) Field of Classification Search
CPC .... G06T 11/10; G06T 2200/24; G02B 21/008
See application file for complete search history.

(56) References Cited

U.S. PATENT DOCUMENTS

| | | | | |
|---|---|---|---|---|
| 11,900,574 | B2 | 2/2024 | Isono et al. | |
| 2017/0293205 | A1* | 10/2017 | Iwata | G03B 17/18 |
| 2017/0295300 | A1* | 10/2017 | Esashi | A61B 6/469 |
| 2019/0364222 | A1* | 11/2019 | Ono | H04N 17/002 |
| 2020/0219298 | A1* | 7/2020 | Urabe | G06T 11/26 |

FOREIGN PATENT DOCUMENTS

| | | | | | |
|---|---|---|---|---|---|
| CN | 104838645 | A | * | 8/2015 | H04N 25/618 |
| JP | 4072439 | B2 | * | 4/2008 | |
| JP | 2016143030 | A | * | 8/2016 | G02B 21/361 |
| JP | 7291808 | B2 | | 6/2023 | |
| WO | WO-2013048436 | A1 | * | 4/2013 | H04N 25/673 |
| WO | WO-2021144830 | A1 | * | 7/2021 | G02B 21/368 |

* cited by examiner

*Primary Examiner* — Fernando Alcon
(74) *Attorney, Agent, or Firm* — Holtz, Holtz & Volek PC

(57) ABSTRACT

An image processing system includes a scanning unit, a pixelated photon detector (PPD), a memory in which a plurality of tables in which an intensity gradation value and an output gradation value are associated with each other are stored, and a processor. The processor generates first image data in which the intensity gradation value indicated by a light intensity signal output from the PPD is set as a pixel value of a constituent pixel based on the light intensity signal and a scanning position of the scanning unit, generates second image data in which the output gradation value is set as a pixel value of a constituent pixel by converting the first image data based on one table selected from the plurality of tables stored in the memory, and causes a display unit to display an image represented by the second image data.

17 Claims, 9 Drawing Sheets

40: ICON BUTTON GROUP

50: LUMINANCE RANGE DISPLAY SECTION

51: LUMINANCE RANGE BAR

52: UPPER LIMIT VALUE INDICATOR

53: LOWER LIMIT VALUE INDICATOR cellSens FV

File Tool Window Tools Window Help

Viewer

CH1 Violet

41: LUMINANCE RANGE SELECTION BUTTON

60: SAMPLE IMAGE

IMAGE PROCESSING SYSTEM, IMAGE PROCESSING METHOD, AND COMPUTER-READABLE MEDIUM

CROSS REFERENCE TO RELATED APPLICATIONS

This application is based upon and claims the benefit of priority from prior Japanese Patent Application No. 2023-171096, filed Oct. 2, 2023, the entire contents of which are incorporated herein by this reference.

TECHNICAL FIELD

The disclosure herein relates to an image processing system, and in particular, to an image processing system including a pixelated photon detector (PPD).

BACKGROUND

As a technology for easily performing contrast adjustment of an image in an image processing system including a PPD such as a laser scanning microscope system, a technology described in Japanese Patent No. 7291808 has been known. In the technology, for example, a contrast of an image generated based on an intensity signal of light detected by the PPD and a scanning position of a scanner is adjusted using a look-up table (LUT), and the image after adjustment is displayed. There is also known a technology of updating the LUT according to setting of a range of gradation (identification range) to be identified in the image before adjustment so that the identification range falls within the entire display gradation range of a display device that displays the image after adjustment.

SUMMARY

An image processing system according to an aspect of the present invention includes: a scanner; a pixelated photon detector (PPD); a memory in which a plurality of tables in which an intensity gradation value and an output gradation value are associated with each other are stored; and a processor configured to execute processing of: generating first image data in which the intensity gradation value indicated by a light intensity signal output from the PPD is set as a pixel value of a constituent pixel, based on the light intensity signal and a scanning position of the scanner; generating second image data in which the output gradation value is set as a pixel value of a constituent pixel by converting the first image data based on one table selected from the plurality of tables stored in the memory; and causing a display to display an image represented by the second image data.

BRIEF DESCRIPTION OF DRAWINGS

The present invention will be more apparent from the following detailed description when the accompanying drawings are referenced.

DESCRIPTION OF EMBODIMENTS

Hereinafter, embodiments will be described in detail with reference to the drawings.

Recently, there has been a shift from a photomultiplier tube (PMT) to a pixelated photon detector (PPD) or the like as a detection element used for detecting a light intensity. When the PPD is adopted as the detection element in a laser scanning microscope, an applied high voltage HV which is necessary for the PMT becomes unnecessary. However, for this reason, as a method of adjusting a luminance of an acquired image, a method of changing an output level of the detection element by adjusting sensitivity of the detection element cannot be used, and only a method of adjusting an irradiation intensity (laser power) of laser light with which a sample is irradiated is used.

Meanwhile, when a sample is imaged using a laser scanning microscope, an imaging condition adjustment operation or an image search (sample search) operation such as focusing is performed in advance. Since irradiation with laser light by the laser scanning microscope may cause fading of the sample, it is desirable to lower laser power as much as possible during the above-described operation than during normal imaging, and it is desirable to shorten an operation time.

On the other hand, during imaging for obtaining an official image of the sample, the irradiation intensity of the laser light may be further increased than that in normal imaging despite a possibility of fading of the sample in order to obtain a favorable high-contrast image with a large number of gradations. It is clear that it is desirable to perform imaging under such an irradiation intensity in a short time.

As described above, in the acquisition of the image using the laser scanning microscope, the irradiation intensity of the laser light is changed according to the purpose of observation of the acquired image. When the irradiation intensity is changed, an intensity of light received from the sample by a light receiving element of the laser scanning microscope is changed. In the technology described in Japanese Patent No. 7291808 described above, it is necessary to update a look-up table (LUT) by changing setting of an identification range every time the irradiation intensity is changed, and a time has been spent for such a setting change.

Based on the above circumstances, an image processing system 1 that can quickly perform necessary system adjustment according to an observation condition will be described as an embodiment.

Figure 1:
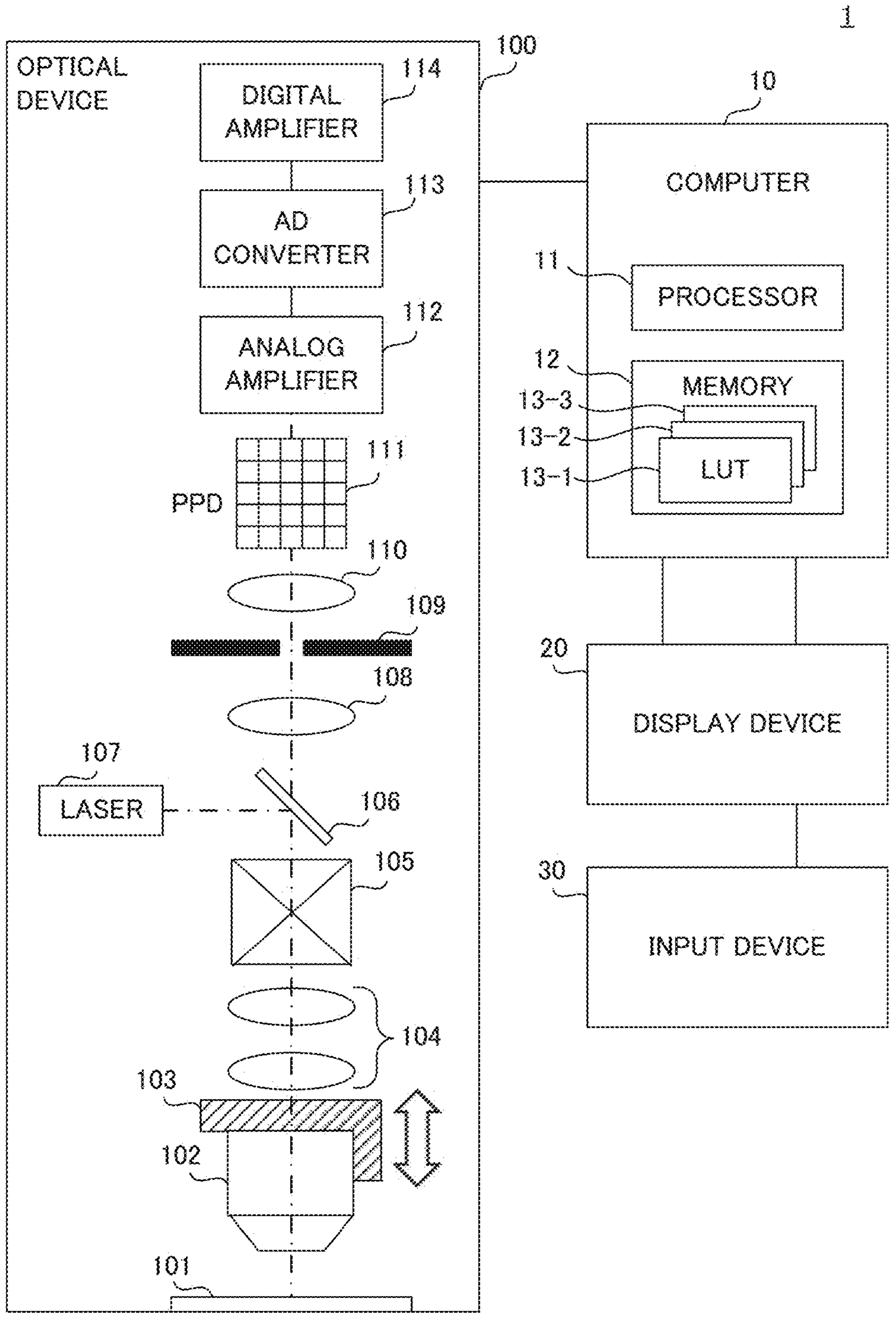
FIG. 1 is a diagram illustrating a configuration example of an image processing system according to an embodiment.

FIG. 1 is a diagram illustrating a configuration example of the image processing system 1 according to an embodiment.

As illustrated in FIG. 1, the image processing system 1 includes an optical device 100, a computer 10 connected to the optical device 100, and a display device 20 and an input device 30 connected to the computer 10. The optical device 100 is, for example, a main body of a laser scanning microscope, and the image processing system 1 is, for example, a laser scanning microscope system.

The optical device 100 includes a scanner that scans a sample with light and a PPD 111. The computer 10 adjusts a contrast of an image generated based on an intensity signal of light detected by the PPD 111 and a scanning position of the scanner, and displays the image after the adjustment on the display device 20. Furthermore, the computer 10 may control the optical device 100 based on information input by a user using the input device 30.

In the optical device 100, a scanning unit 105 scans a sample on a stage 101 with laser light emitted from a laser 107, and the PPD 111 detects light from the sample incident via a confocal optical system including a confocal diaphragm 109. Then, the optical device 100 outputs the intensity signal of the light from the sample detected by the PPD 111 and the scanning position of the scanning unit 105 to the computer 10.

The optical device 100 includes the stage 101, an objective lens 102, a focusing device 103, a relay optical system 104, the scanning unit 105, a beam splitter 106, the laser 107 as a light source, an imaging lens 108, the confocal diaphragm 109, and a lens 110. The optical device 100 further includes the PPD 111, an analog amplifier 112, an analog-to-digital (AD) converter 113, and a digital amplifier 114.

The laser light emitted from the laser 107 and reflected by the beam splitter 106 enters the objective lens 102 via the scanning unit 105 and the relay optical system 104. The beam splitter 106 is, for example, a dichroic mirror that reflects laser light. The objective lens 102 condenses the laser light on the sample arranged on the stage 101 to form a light spot on the sample.

In the sample irradiated with the laser light, a fluorescent substance is excited, and fluorescence having a wavelength different from that of the laser light is emitted. The fluorescence is transmitted through the beam splitter 106 via the objective lens 102, the relay optical system 104, and the scanning unit 105, and is condensed on the confocal diaphragm 109 by the imaging lens 108. In the confocal diaphragm 109, a confocal pinhole is formed at a position optically conjugate with a focal position on a front side (sample side) of the objective lens 102. Therefore, the fluorescence generated at a position other than a position where the light spot is formed is blocked by the confocal diaphragm 109, and only the fluorescence generated at the position where the light spot is formed passes through the confocal diaphragm 109 and is detected by the PPD 111 via the lens 110.

The PPD 111 that has detected the light from the sample outputs a light intensity signal corresponding to the number of incident photons, that is, an intensity signal indicating an intensity of the light. The light intensity signal output from the PPD 111 is amplified by the analog amplifier 112 and the digital amplifier 114 before and after sampling by the AD converter 113. The optical device 100 outputs the intensity signal amplified by the analog amplifier 112 and the digital amplifier 114 and the scanning position corresponding to the intensity signal to the computer 10.

In the present embodiment, the intensity signal output from the optical device 100 to the computer 10 has a length of 16 bits. That is, it is assumed that the number of gradations of an intensity gradation value indicated by the intensity signal is 65,536 gradations. It is a matter of course that a bit length of the intensity gradation value may be other than 16 bits.

The scanning unit 105 includes at least one set of scanners that scan the sample in directions orthogonal to each other. The scanning unit 105 may include, for example, two galvanometer scanners, or may include a galvanometer scanner and a resonant scanner. Note that the scanners included in the scanning unit 105 are not limited to the galvanometer scanner and the resonant scanner. Any other optical deflector such as an acousto-optic deflector (AOD) may be adopted for the scanner as long as it is configured to scan the sample while deflecting the light. By changing a swing angle of the scanner and thereby changing a direction of deflecting the laser light, it is possible to change an angle of the laser light with respect to an optical axis in a pupil plane of the objective lens 102. As a result, the position of the light spot can be moved in a direction orthogonal to the optical axis of the objective lens 102. By controlling the scanning unit 105 in response to an instruction from the computer 10, the optical device 100 can scan the sample two-dimensionally with the laser light, and can acquire information necessary for constructing a two-dimensional image of the sample.

The computer 10 includes at least one processor 11 and at least one memory 12.

The processor 11 is configured to execute generation processing of generating image data based on the intensity signal output from the optical device 100 and the scanning position corresponding to the intensity signal. More specifically, the generation processing is processing of generating image data representing an image in which the intensity gradation value representing the intensity of the light from the sample indicated by the intensity signal is set as a pixel value of a constituent pixel corresponding to the scanning position.

In the following description, the image data generated by the generation processing is referred to as “first image data”.

The processor 11 is configured to further execute selection instruction processing of acquiring an instruction to select one of LUTs 13-1, 13-2, and 13-3 to be used for image adjustment. The LUTs 13-1, 13-2, and 13-3 are tables in which the intensity gradation value representing the intensity of the light and an output gradation value are associated with each other, and are stored in the memory 12 in advance.

The processor 11 is further configured to execute conversion processing of converting the first image data by using one selected from among the LUTs 13-1, 13-2, and 13-3 according to the instruction and generating image data in which the output gradation value is set as the pixel value of the constituent pixel. More specifically, in the conversion processing, the intensity gradation value of the light, which is the pixel value of each constituent pixel in the first image data, is converted into the associated output gradation value in one selected from among the LUTs 13-1, 13-2, and 13-3.

In the following description, the image data generated from the first image data by the conversion processing is referred to as “second image data”.

The processor 11 is configured to further execute display processing of displaying an image represented by the generated second image data on the display device 20.

The processor 11 may execute the above-described processing by executing software stored in the memory 12, or may execute the above-described processing by hardware processing. Alternatively, the processor 11 may execute the above-described processing by a combination of software processing and hardware processing. The software executed by the processor 11 is stored in a computer-readable medium. The processor 11 can include any electric circuit and include at least one of a circuit that processes a digital signal and a circuit that processes an analog signal. The processor 11 includes, for example, one or more integrated circuits (ICs) on a circuit board, and may further include one or more electronic components. The IC may be, for example, a central processing unit (CPU), a graphics processing unit (GPU), or a digital signal processor (DSP). The IC may be an application specific integrated circuit (ASIC), a field-programmable gate array (FPGA), or the like.

The memory 12 includes a computer-readable medium storing software to be executed by the processor 11. Note that, in the present specification, the computer-readable medium is a non-transitory computer-readable medium. The memory 12 can include, for example, one or more optional semiconductor memories and one or more other storage devices. The semiconductor memory includes, for example, a volatile memory such as a random access memory (RAM), and a nonvolatile memory such as a read only memory (ROM), a programmable ROM, or a flash memory. The RAM may include, for example, a dynamic random access memory (DRAM) and a static random access memory (SRAM), and the like. The other storage device may include, for example, a magnetic storage device including, for example, a magnetic disk as a computer-readable medium, an optical storage device including, for example, an optical disk as a computer-readable medium, and the like.

The display device 20 is an example of a display of the image processing system 1. The display device 20 is, for example, a liquid crystal display, an organic electro-luminescence (OEL) display, a cathode ray tube (CRT) display, or the like. For example, a setting screen is displayed on the display device 20.

The input device 30 is an example of an input unit of the image processing system 1. The input device 30 outputs an operation signal corresponding to a user operation to the computer 10. The input device 30 is, for example, a keyboard, and may include a mouse, a joystick, a touch panel, a stylus, and the like.

The image processing system 1 illustrated in FIG. 1 includes the above components.

Next, the LUTs 13-1, 13-2, and 13-3 will be described in more detail.

In a specific application such as observation by combining strong and weak colors or observation in which a difference in luminance depending on an observation position such as a depth (Z-direction position) or an X-Y direction position is large, for example, 65,536 gradations (a length of 16 bits) may be desired for the acquired image. For example, in comprehensive consideration of various applications including those described above, it is assumed that the number of gradations required for the acquired image is about 2000 ($\approx$2048 ($2^{11}$)) when converted into the number of incident photons on the PPD 111. The PPD 111 has a dynamic range sufficient to obtain an image having such an extremely larger number of gradations.

On the other hand, in the image search operation described above, even if the image is saturated, it is sufficient if the presence or absence of the image of the sample can be visually recognized from the image, and thus, there is no problem even if the number of gradations desired for the acquired image is as low as 256 (a length of 8 bits, which is equivalent to eight photons). However, in the operation, when the irradiation intensity of the laser light for the sample is weakened in order to suppress the fading of the sample, the acquired image becomes a dark image.

A lower intensity gradation value range of the intensity gradation values of 65,536 gradations (a range of gradation values 0 to 255) may be used as a range in which the output gradation value is linearly changed with respect to the intensity gradation value. In this way, even when the light from the sample is weak and the intensity gradation value is thus distributed in a low intensity gradation value region, it is possible to easily visually recognize the image of the sample while suppressing fading at the time of image search.

In addition, in a general application except for the specific applications as described above, 4,096 gradations (a length of 12 bits, which is equivalent to 128 photons) are sufficient as the desired number of gradations for the acquired image even when considering that image analysis processing may be executed later.

As described above, in the image search operation, the general application, and the like, it is necessary to adjust the number of gradations of the acquired image. For example, in a case where the number of gradations of the acquired image is 65,536, an image with 1/256 of the number of gradations is sufficient for the image search operation described above, and an image with 1/16 of the number of gradations is sufficient for the general application described above.

The LUTs 13-1, 13-2, and 13-3 in the present embodiment are used for adjustment of the number of gradations of the image obtained in a case where the intensity of the light from the sample is low.

Figure 2:
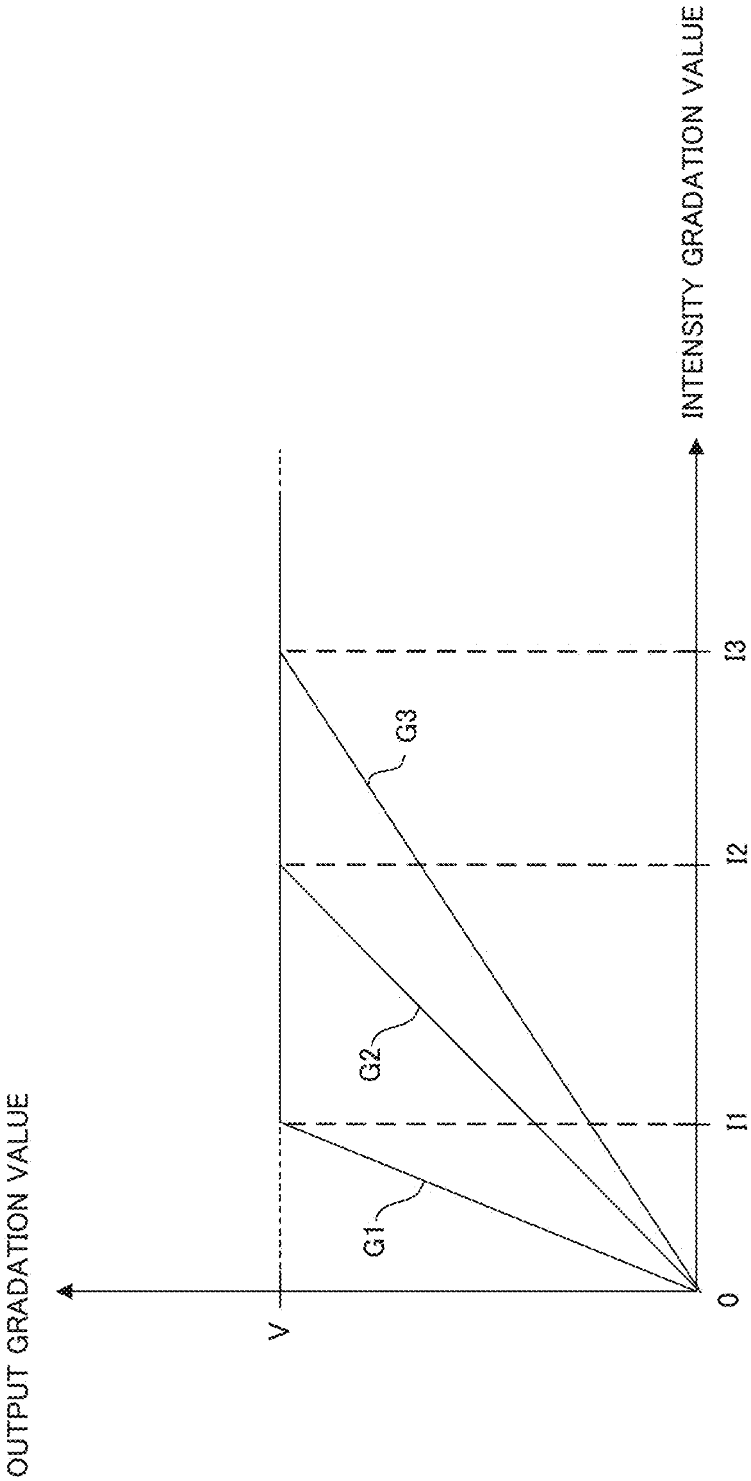
FIG. 2 is a graph illustrating an example of a relationship between an intensity gradation value and an output gradation value of each look-up table (LUT)

Here, FIG. 2 will be described. FIG. 2 is a graph illustrating an example of a relationship between the intensity gradation value and the output gradation value for each of the LUTs 13-1, 13-2, and 13-3.

In FIG. 2, lines G1, G2, and G3 represent a relationship between the intensity gradation value indicating the intensity of the light and the output gradation value associated with the intensity gradation value for the LUTs 13-1, 13-2, and 13-3, respectively. In FIG. 2, the horizontal axis represents the intensity gradation value (a gradation value representing the intensity indicated by the intensity signal output from the optical device 100), and the vertical axis represents the output gradation value.

The LUT 13-1 having the relationship of the line G1 is a table used to obtain an image with the smallest number of gradations.

In the line G1, the output gradation value when the intensity gradation value is a predetermined upper limit value I1 is V, and the intensity gradation value and the output gradation value are in a proportional relationship in a range where the intensity gradation value is equal to or smaller than I1. The line G1 has a relationship in which the output gradation value V when the intensity gradation value is I1 is associated with all the intensity gradation values in a range exceeding I1. With such a relationship, for example, in a case where the value of I1 is 255, the intensity gradation value having the number of gradations of 16 bit (65,536 gradations) is converted into the output gradation value of 256 gradations (8 bits).

By performing image conversion using such an LUT 13-1, it is possible to display an image of the sample having a contrast of a certain level without exceeding an upper limit of a gradation range displayable on the display device 20 even when the irradiation intensity of the laser light on the sample is decreased.

The LUT 13-2 having the relationship of the line G2 is a table used to obtain an image with a larger number of gradations than the LUT 13-1.

In the line G2, the output gradation value when the intensity gradation value is a predetermined upper limit value I2 (>I1) is V, and the intensity gradation value and the output gradation value are in a proportional relationship in a range where the intensity gradation value is equal to or smaller than I2. The line G2 has a relationship in which the output gradation value V when the intensity gradation value is 12 is associated with all the intensity gradation values in a range exceeding I2. With such a relationship, for example, in a case where the value of I2 is 4,095, the intensity gradation value having the number of gradations of 16 bits (65,536 gradations) is converted into the output gradation value of 4,096 gradations (12 bits). The number of gradations of the output gradation value is, for example, such a number of gradations that does not impair gradations that can express each of three primary colors (RGB) of light in a standard display device by 8 bits. Note that the number of gradations of 4,096 is similar to that of the laser scanning microscope system using the PMT, making it more familiar to a user of the system. In addition, the number of gradations is equivalent to 128 photons when converted into the number of incident photons on the PPD 111, and is a realistic value for the laser scanning microscope system using the PPD.

The LUT 13-3 having the relationship of the line G3 is a table used to obtain an image having a larger number of gradations than the LUT 13-2.

In the line G3, the output gradation value when the intensity gradation value is I3 (>I2) is V, and the intensity gradation value and the output gradation value are in a proportional relationship in a range where the intensity gradation value is equal to or smaller than I3. The line G3 has a relationship in which the output gradation value V when the intensity gradation value is I3 is associated with all the intensity gradation values in a range exceeding I3. With such a relationship, for example, in a case where the value of I3 is 16,383, the intensity gradation value having the number of gradations of 16 bit (65,536 gradations) is converted into the output gradation value of 16,384 gradations (14 bits). The number of gradations of 16384 is sufficient for gradation loss to be ignored when post-processing image data that is a super-resolution image or a high dynamic range (HDR) image.

In the line G3, for example, the value of I3 may be 65,535, and the intensity gradation value having the number of gradations of 16 bit may be directly converted into the output gradation value of 65,536 gradations (16 bits).

The relationship between the intensity gradation value and the output gradation value for the LUTs 13-1, 13-2, and 13-3 is not limited to the relationship indicated by the lines G1, G2, and G3 in FIG. 2. For example, the output gradation value corresponding to the upper limit value I1 of the intensity gradation value in the line G1, the output gradation value corresponding to the upper limit value I2 of the intensity gradation value in the line G2, and the output gradation value corresponding to the upper limit value I3 of the intensity gradation value in the line G3 may be different values from each other. In addition, for example, in a range in which the intensity gradation values in the lines G1, G2, and G3 are equal to or smaller than a predetermined upper limit value, the output gradation value may be monotonously increased as the intensity gradation value is increased. Further, for example, the output gradation value when the intensity gradation value is zero may be associated with a value larger than zero.

Further, for example, the output gradation value associated with the intensity gradation value near 0 (for example, a gradation value of 10) may be 0. In this case, the upper limit values I1, I2, and I3 of the lines G1, G2, and G3 in FIG. 2 are changed and increased (for example, increased by 10 gradations), and the output gradation value has a relationship of monotonically increasing with respect to the intensity gradation value between a lower limit value and the upper limit value. In this way, the number of gradations (the number of bits) of the output gradation value can be maintained, and in a case where an offset component is added to the intensity signal output from the PPD 111, the offset component can be effectively reduced.

In the following description, the conversion processing executed by the processor 11 using the LUT 13-1 having the relationship of the line G1 is referred to as "conversion processing by a luminance range A". Similarly, the conversion processing executed by the processor 11 using the LUT 13-2 having the relationship of the line G2 is referred to as "conversion processing by a luminance range B". Furthermore, the conversion processing executed by the processor 11 using the LUT 13-3 having the relationship of the line G3 is referred to as "conversion processing by a luminance range C".

Next, a specific example of processing using the above-described image processing system 1 will be described.

Figure 3:
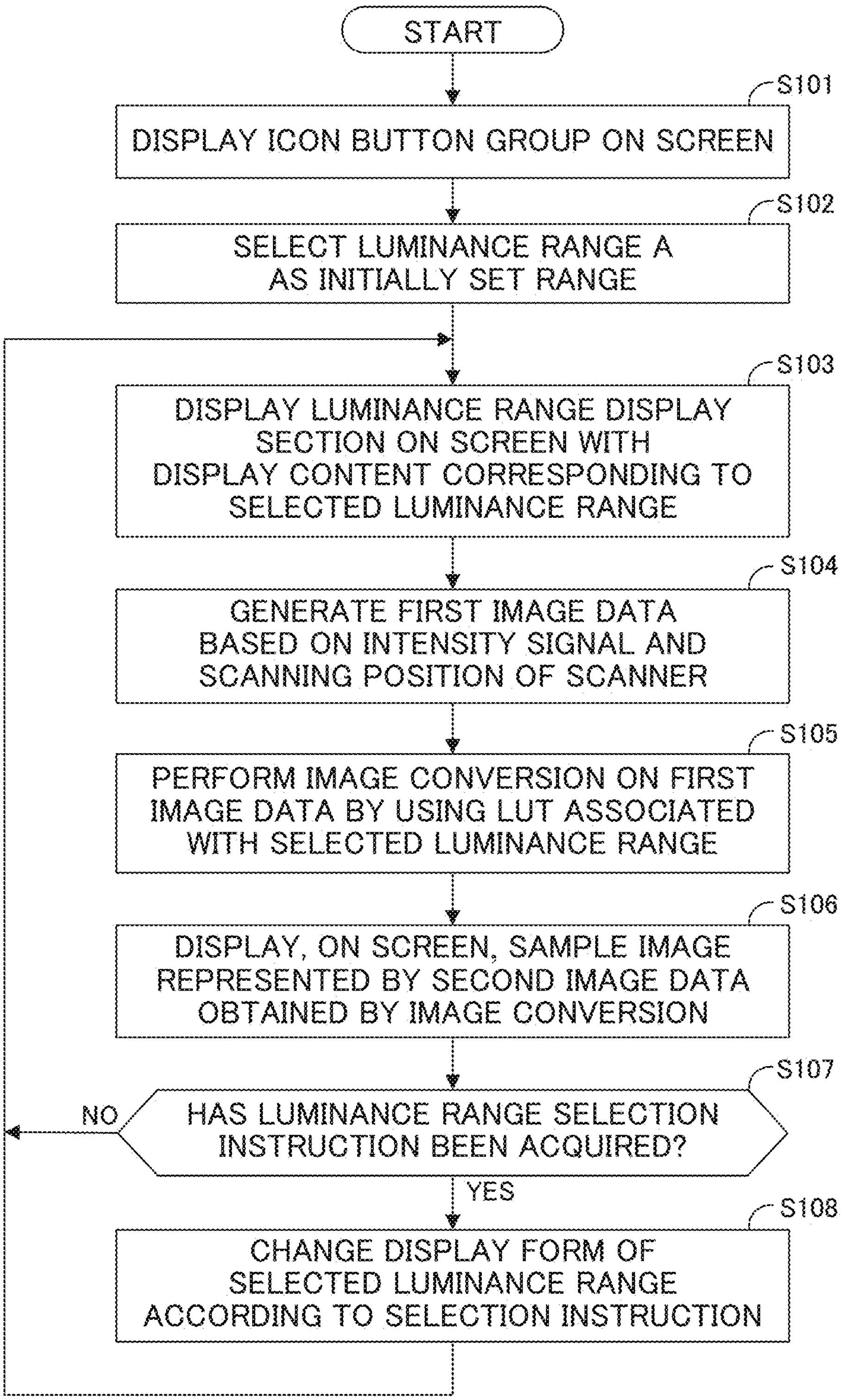
FIG. 3 is a flowchart illustrating a processing content of processing executed by a processor.
Figure 4A:
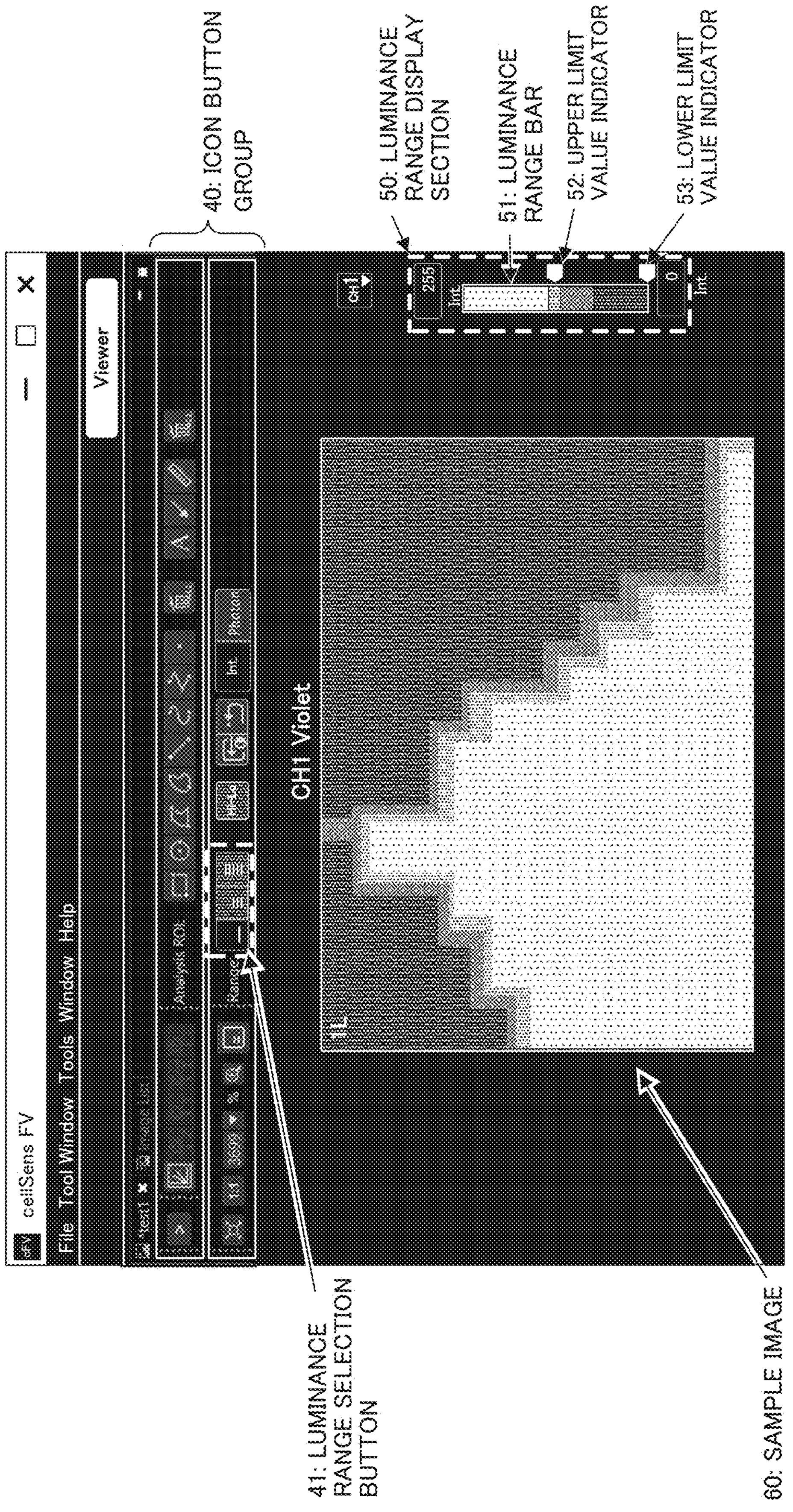
FIG. 4A illustrates a first example (part 1) of a display screen on a display device.
Figure 4B:
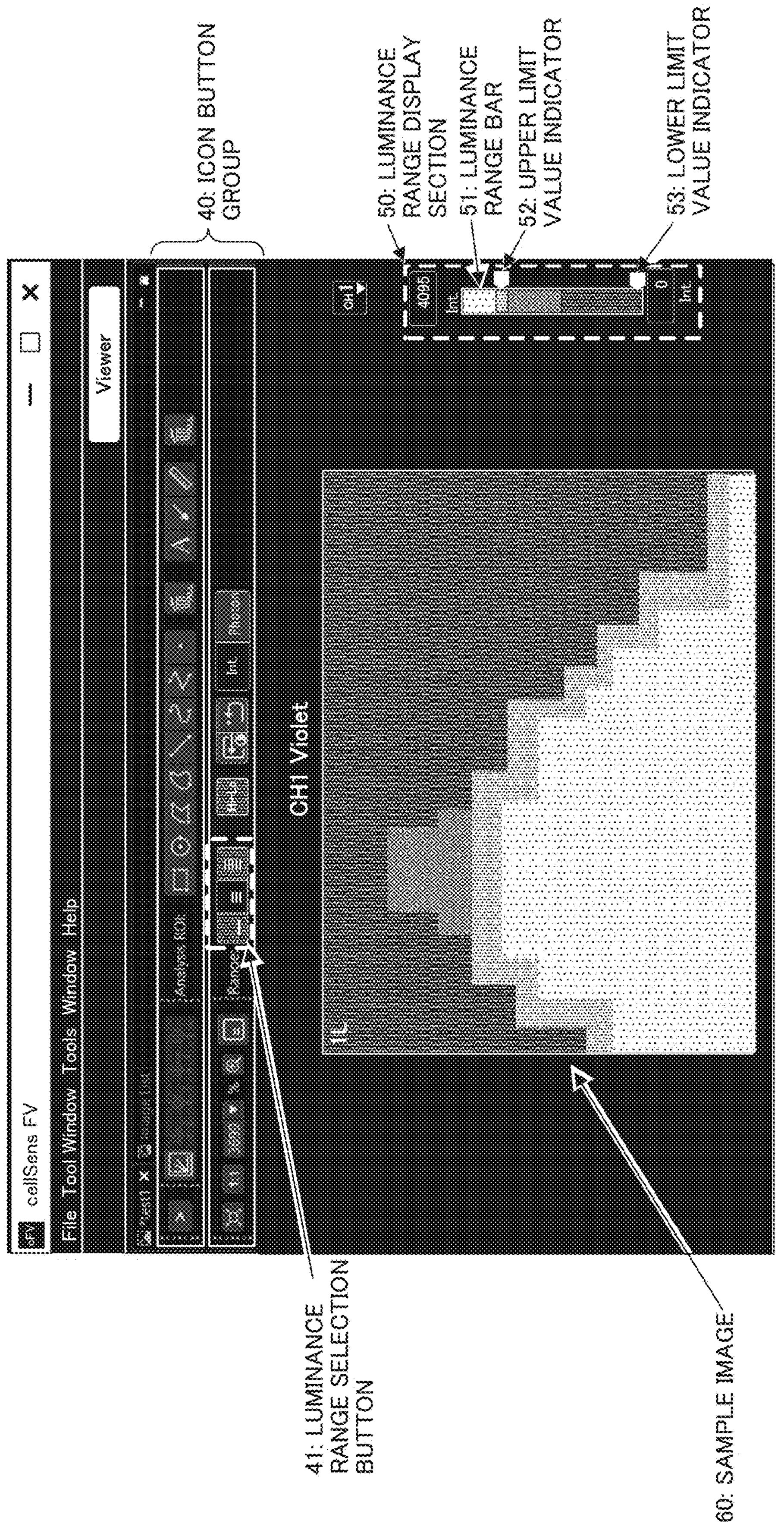
FIG. 4B illustrates the first example (part 2) of the display screen on the display device.
Figure 4C:
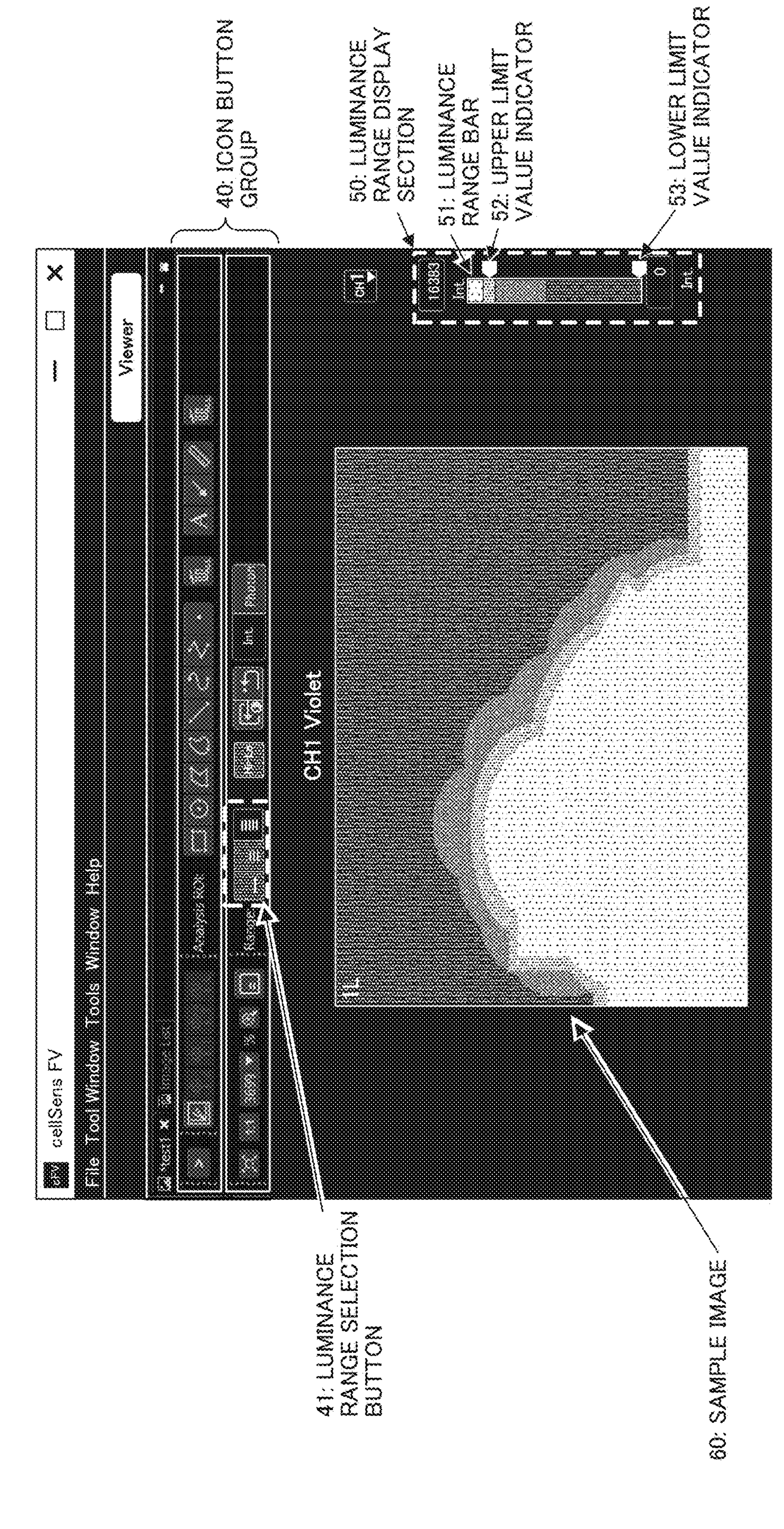
FIG. 4C illustrates the first example (part 3) of the display screen on the display device.

FIG. 3 is a flowchart illustrating a processing content of the processing executed by the processor 11 included in the computer 10. FIGS. 4A, 4B, and 4C illustrate a first example of a display screen of the display device 20.

When the processing of FIG. 3 is started by activating the image processing system 1, first, in S101, processing of displaying an icon button group 40 on the screen of the display device 20 is executed.

The computer 10 employs a graphical user interface (GUI) using a window system, and in the processing of S101, the icon button group 40 is displayed in a window for the image processing system 1.

The icon button group 40 includes a luminance range selection button 41. The luminance range selection button 41 includes three icon buttons, and the icon buttons are associated with the luminance ranges A, B, and C, respectively.

Next, in S102, processing of selecting the luminance range A among the three luminance ranges as an initially set luminance range is executed. In the processing, the luminance range B or the luminance range C among the three luminance ranges may be selected as the initially set luminance range.

FIG. 4A illustrates a display example in a case where the icon button associated with the luminance range A in the luminance range selection button 41 is selected. FIGS. 4B and 4C are display examples in a case where the icon buttons associated with the luminance ranges B and C in the luminance range selection button 41 are selected, respectively. As described above, any one of the three icon buttons in the luminance range selection button 41 is selected.

In S103, processing of displaying a luminance range display section 50 on the screen of the display device 20 with a display content corresponding to the selected luminance range at the current processing timing is executed.

In S104, the above-described generation processing is executed, and the first image data is generated based on the intensity signal received from the optical device 100 and the scanning position corresponding to the intensity signal. The generated first image data may be stored in the memory 12 as necessary.

In S105, the above-described conversion processing is executed, and the second image data is generated from the first image data generated in the most recent processing of S104 by using one of the LUTs 13-1, 13-2, and 13-3 corresponding to the selected luminance range at the current processing time. For example, in a case where the processing of S105 is executed immediately after the processing of S102 described above, the conversion processing is executed using the LUT 13-1 associated with the luminance range A.

In the display example of FIG. 4A, the luminance range display section 50 in a case where the luminance range A is selected is displayed in the window. In FIGS. 4B and 4C, the luminance range display sections 50 in a case where the luminance ranges B and C are selected are displayed in the window, respectively.

The luminance range display section 50 includes a luminance range bar 51, an upper limit value indicator 52, and a lower limit value indicator 53.

The luminance range bar 51 represents a correspondence between a pixel value of each constituent pixel of the second image data and a color of a pixel of a sample image 60 displayed in the window by the processing of S106 described below.

As described above, the second image data is image data in which the output gradation values of the LUTs 13-1, 13-2, and 13-3 are set as pixel values of the constituent pixels. A vertical direction of the luminance range bar 51 represents a magnitude relationship of the output gradation value. The upper limit value indicator 52 indicates a vertical position of the luminance range bar 51 corresponding to the maximum value of the output gradation value, and the lower limit value indicator 53 indicates a vertical position of the luminance range bar 51 corresponding to the minimum value of the output gradation value.

As an example, in the example of FIG. 4A in which the luminance range A is selected, the upper limit value indicator 52 represents the position of the luminance range bar 51 corresponding to the output gradation value of "255", and the lower limit value indicator 53 represents the position of the luminance range bar 51 corresponding to the output gradation value of "0". The values respectively correspond to the upper limit value (when V=255) and the lower limit value of the output gradation value in the line G1 of FIG. 2 representing the relationship between the intensity gradation value and the output gradation value for the LUT 13-1 corresponding to the luminance range A.

In the display examples of FIGS. 4A, 4B, and 4C, in the luminance range bar 51, a region above the position indicated by the upper limit value indicator 52 is displayed in a single color (for example, light blue). In addition, a region between the position indicated by the upper limit value indicator 52 and the position indicated by the lower limit value indicator 53 is displayed in gradation that gradually and continuously changes from the single color to black. In each drawing, the gradation is conveniently expressed by a gradual change in density of shading. As described above, the output gradation value is expressed by colors of the vertical positions of the luminance range bar 51.

In S106, the above-described display processing is executed, and the sample image 60 represented by the second image data generated by the conversion processing of S105 is displayed on the screen of the display device 20. By the display processing, each constituent pixel of the sample image 60 in the window is displayed in the color of the luminance range bar 51 corresponding to the output gradation value as the pixel value. That is, the luminance range bar 51 represents the correspondence between the color of each constituent pixel of the sample image 60 and the output gradation value.

In S107, processing of determining whether or not a luminance range selection instruction has been newly acquired in response to a click operation on the luminance range selection button 41 performed by an operation on the input device 30 is executed. In a case where it is determined in the determination processing that the luminance range selection instruction has been newly acquired (the determination result is YES), the processing proceeds to S108. On the other hand, in a case where it is determined in the determination processing that a new selection instruction has not been acquired (the determination result is NO), the processing returns to S103, and the processing of and after S103 described above is executed again. In the conversion processing of S105 executed at this time, among the LUTs 13-1, 13-2, and 13-3, the same one used in the most recently executed conversion processing is used.

In S108, processing of changing each icon button of the luminance range selection button 41 displayed on the screen of the display device 20 to a display form according to the luminance range selection instruction determined to be acquired by the determination processing in S107 is executed. Thereafter, the processing returns to S103, and the processing of and after S103 described above is executed again. In the conversion processing of S105 executed at this time, among the LUTs 13-1, 13-2, and 13-3, the one corresponding to the luminance range indicated by the luminance range selection instruction determined to be acquired by the determination processing of S107 is used.

By executing the above processing by the processor 11, screens illustrated in FIGS. 4A, 4B, and 4C are displayed on the display device 20. When the user of the image processing system 1 operates the input device 30 to perform the click operation on the luminance range selection button 41, the luminance range is switched and the selection of the LUTs 13-1, 13-2, and 13-3 is changed and immediately reflected on the display of the sample image 60 on the screen. Therefore, quick adjustment of the sample image 60 becomes possible.

The display form of the image displayed on the display device 20 based on the second image data by the processor 11 may be different from the display forms illustrated in FIGS. 4A, 4B, and 4C. As an example of such different display forms, FIG. 5 illustrates a second example of the display screen on the display device 20, and FIGS. 6A and 6B both illustrate a third example of the display screen on the display device 20.

First, the second example of the display screen will be described. The screen example of FIG. 5 is a screen displayed when a click operation is performed on the High-Low (Hi-Lo) button 42 included in the icon button group 40 by an operation on the input device 30 to bring the icon button into a pressed state in a state in which the display screen of FIG. 4A is displayed.

Figure 5:
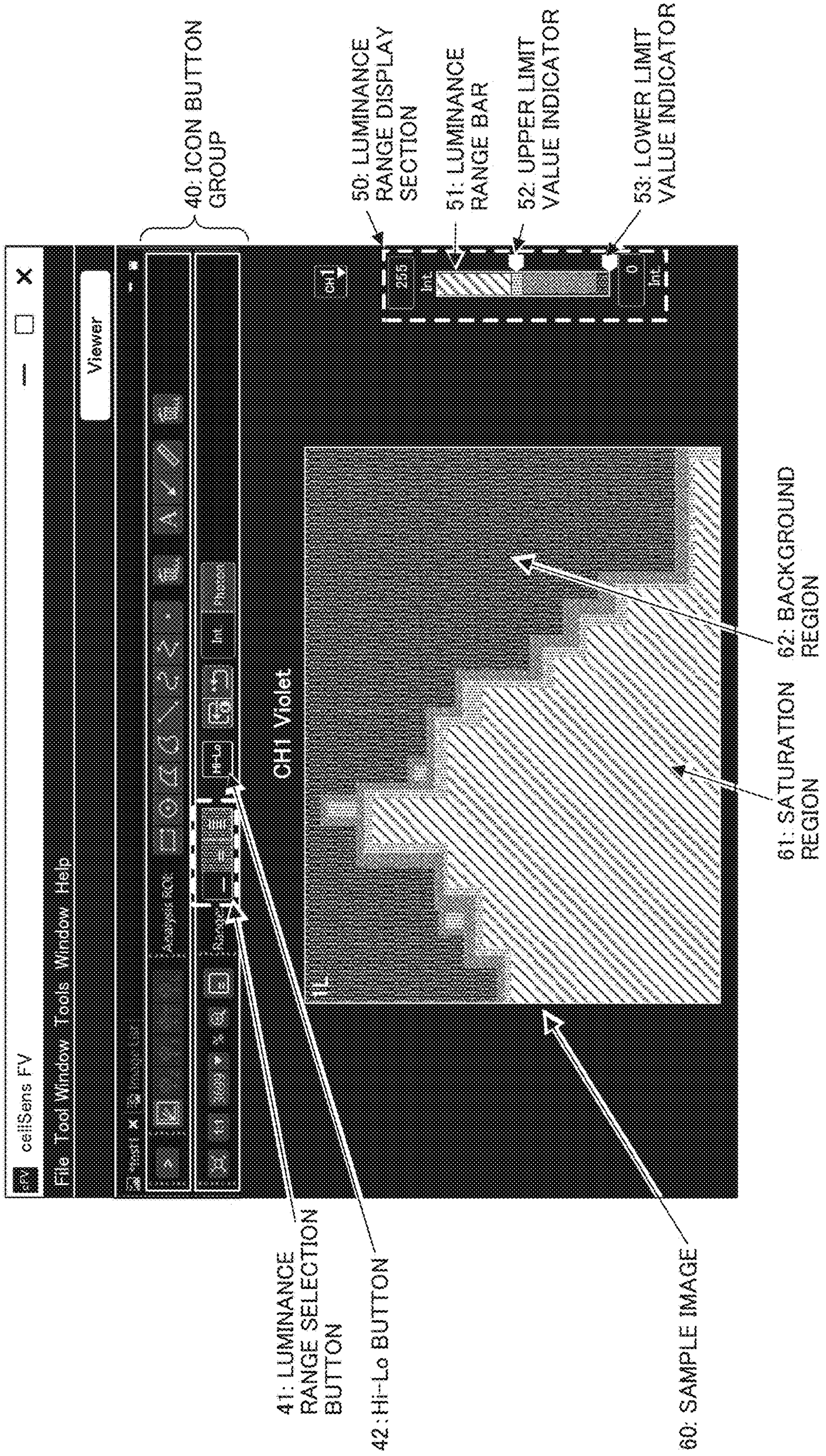
FIG. 5 illustrates a second example of the display screen on the display device.

In the screen example of FIG. 5, the display form of the luminance range bar 51 is different from that in FIG. 4A. More specifically, a region above the position indicated by the upper limit value indicator 52 in the luminance range bar 51 (a region marked with diagonal lines running from the bottom left to the top right in FIG. 5) is uniformly displayed in a first color (for example, red). The position indicated by the upper limit value indicator 52 may be included in the region displayed in the first color. In addition, a region corresponding to the position indicated by the lower limit value indicator 53 is displayed in a second color (for example, dark blue) different from the first color. Then, a region between the position indicated by the upper limit value indicator 52 and the position of the second color indicated by the lower limit value indicator 53 is displayed in gradation that gradually and continuously changes from a color different from both the first and second colors, such as white, to black. In FIG. 5, the gradation is conveniently expressed by uniform shading.

In the case of using the LUT in which the relationship in which the output gradation value associated with the intensity gradation value near 0 is 0 is set as described above, a region below the position indicated by the lower limit value indicator 53 is also displayed in the second color.

In the processing of S103 in the processing of FIG. 3 described above, the processor 11 determines whether or not the Hi-Lo button 42 is pressed. Here, in a case where it is determined that the Hi-Lo button 42 is not pressed, the processor 11 executes processing of displaying the luminance range display section 50 illustrated in FIG. 4A on the screen of the display device 20. On the other hand, in a case where it is determined that the Hi-Lo button 42 is pressed, the processor 11 executes processing of displaying the luminance range display section 50 illustrated in FIG. 5 on the screen of the display device 20.

In the processing of S106 executed after the above-described processing, the display processing is executed as described above, and the sample image 60 represented by the second image data generated by the conversion processing of S105 is displayed on the screen of the display device 20. By the display processing, each constituent pixel of the sample image 60 in the window is displayed in the color of the luminance range bar 51 corresponding to the output gradation value as the pixel value. Therefore, when the luminance range bar 51 is in the display form illustrated in FIG. 5, in the sample image 60, a region (a saturation region 61 in FIG. 5) including constituent pixels whose pixel values exceed the output gradation value indicated by the upper limit value indicator 52 is uniformly displayed in the first color described above. In the sample image 60, a region (a background region 62 in FIG. 5) where the pixel value is the output gradation value indicated by the lower limit value indicator 53 is uniformly displayed in the second color described above.

As described above, when the Hi-Lo button 42 is pressed by the click operation, the processor 11 that has acquired the click operation executes processing of uniformly setting the color of the constituent pixel of the second image data corresponding to the constituent pixel of the first image data whose pixel value exceeds the predetermined upper limit value to the first color. Furthermore, at this time, the processor 11 executes processing of uniformly setting the color of the constituent pixel of the second image data corresponding to the constituent pixel having the minimum pixel value in the first image data to the second color different from the first color.

Furthermore, at this time, the processor 11 executes processing of setting the color of the remaining constituent pixels of the second image data to a color corresponding to the output gradation value that is the pixel value, that is, a color indicated by the luminance range bar 51 representing the correspondence between the color of the constituent pixel and the output gradation value. Then, the processor 11 executes processing of causing the display device 20 to display the sample image 60 in the color set for each constituent pixel in this manner.

By displaying the second example of the display screen obtained as described above, it is possible to instantaneously grasp whether or not the sample image 60 includes a region where the pixel value exceeds the upper limit value or a region where the pixel value is the lower limit value set for the output gradation value. Therefore, for example, in the image search (sample search) operation described above, it is possible to instantaneously determine whether or not there is a possibility that the laser light having an excessive irradiation intensity is applied to the sample.

Also in a case where the click operation is performed on the Hi-Lo button 42 on the display screen of FIGS. 4B and 4C to bring the icon button into a pressed state, similar display processing is executed, and the luminance range bar 51 and the sample image 60 in the display forms similar to those of FIG. 5 are displayed on the screen.

Next, the third example of the display screen will be described. The screen examples of FIGS. 6A and 6B are screens displayed when the click operation is performed on the Hi-Lo button 42 included in the icon button group 40 by the operation on the input device 30 to bring the icon button into a pressed state in a state in which the display screen of FIG. 4B is displayed.

Figure 6A:
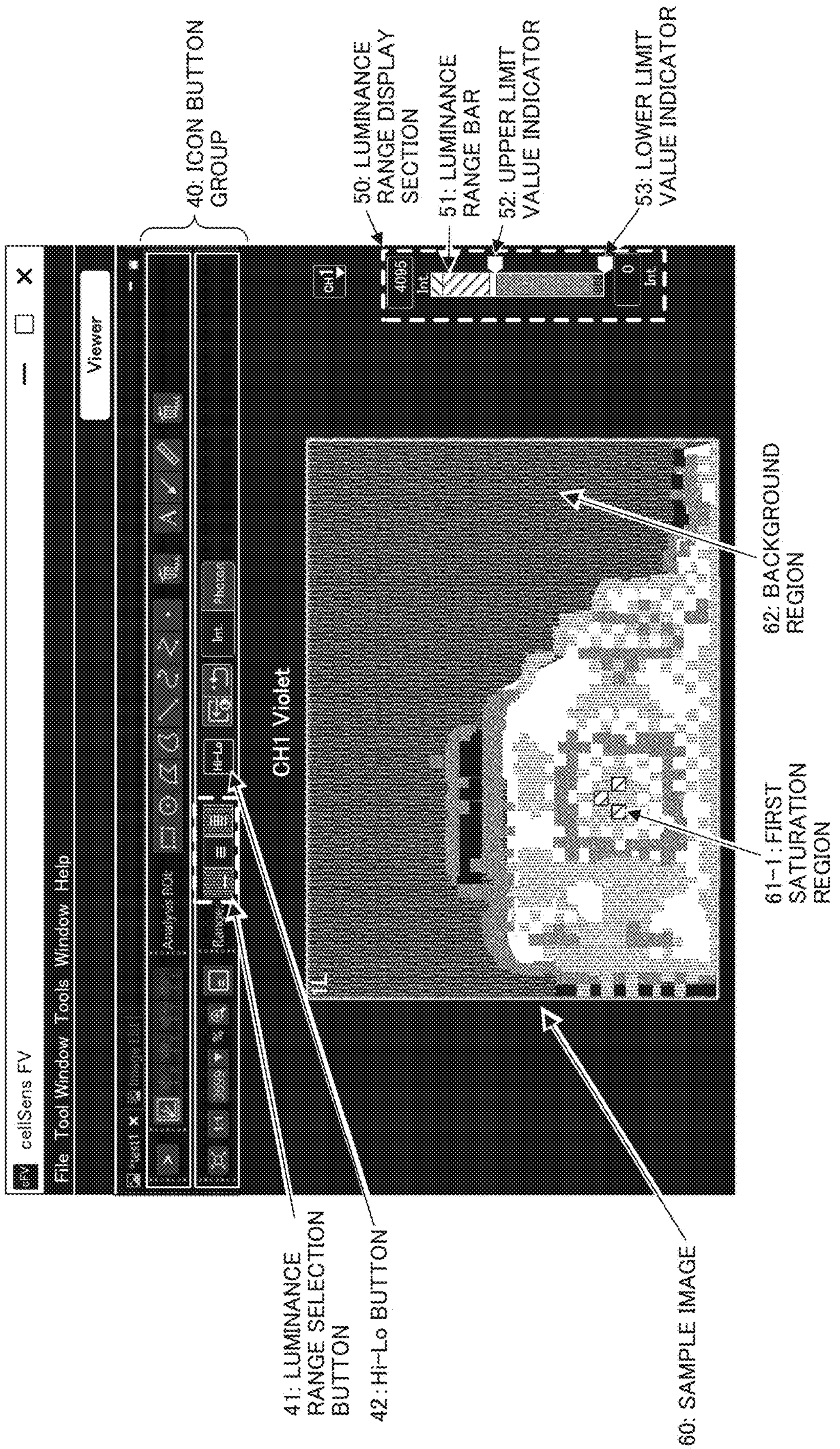
FIG. 6A illustrates a third example (part 1) of the display screen on the display device.
Figure 6B:
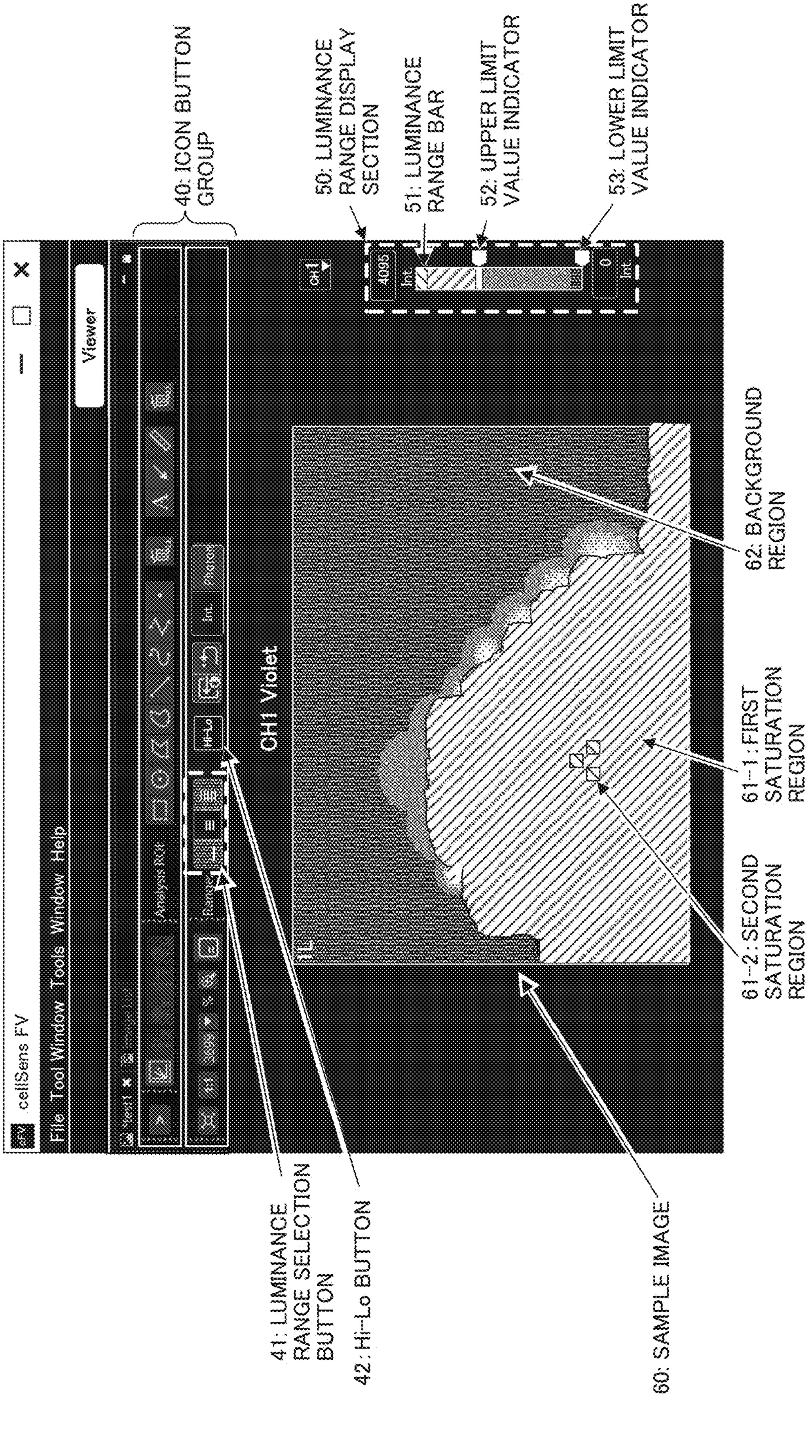
FIG. 6B illustrates the third example (part 2) of the display screen on the display device.

In the screen examples of FIGS. 6A and 6B, the display form of the luminance range bar 51 is different from that in FIG. 4B. More specifically, a region above the position indicated by the upper limit value indicator 52 in the luminance range bar 51 (a region marked with diagonal lines running from the top left to the bottom right in FIGS. 6A and 6B) is uniformly displayed in a first color (for example, orange). The position indicated by the upper limit value indicator 52 may be included in the region displayed in the first color. In addition, a region corresponding to the position indicated by the lower limit value indicator 53 is displayed in a second color (for example, dark blue) different from the first color.

In the case of using the LUT in which the relationship in which the output gradation value associated with the intensity gradation value near 0 is 0 is set as described above, a region below the position indicated by the lower limit value indicator 53 is also displayed in the second color.

Furthermore, in the screen examples of FIGS. 6A and 6B, a region between the position indicated by the upper limit value indicator 52 and the position of the second color indicated by the lower limit value indicator 53 is displayed in gradation that gradually and continuously changes from a color different from both the first and second colors, such as white, to black. In FIGS. 6A and 6B, the gradation is conveniently expressed by uniform shading. Further, a region defining an upper end of the luminance range bar 51, that is, a region at an upper end of the region displayed in the first color (a region marked with diagonal lines running from the bottom left to the top right) is displayed in a third color (for example, red) different from any of the color used in the gradation, the first color, and the second color.

In the processing of S103 in the processing of FIG. 3 described above, the processor 11 determines whether or not the Hi-Lo button 42 is pressed. Here, in a case where it is determined that the Hi-Lo button 42 is not pressed, the processor 11 executes processing of displaying the luminance range display section 50 illustrated in FIG. 4B on the screen of the display device 20. On the other hand, in a case where it is determined that the Hi-Lo button 42 is pressed, the processor 11 executes processing of displaying the luminance range display section 50 illustrated in FIGS. 6A and 6B on the screen of the display device 20.

In the processing of S106 executed after the above-described processing, the display processing is executed as described above, and the sample image 60 represented by the second image data generated by the conversion processing of S105 is displayed on the screen of the display device 20. By the display processing, each constituent pixel of the sample image 60 in the window is displayed in the color of the luminance range bar 51 corresponding to the output gradation value as the pixel value. Therefore, when the luminance range bar 51 is in the display form illustrated in FIG. 6A, in the sample image 60, a region (a first saturation region 61-1 in FIG. 6A) including constituent pixels whose pixel values exceed the output gradation value indicated by the upper limit value indicator 52 is uniformly displayed in the first color. In the sample image 60, a region (a background region 62 in FIG. 6A) where the pixel value is the output gradation value indicated by the lower limit value indicator 53 is uniformly displayed in the second color described above.

In addition, in the processing of S106, the processor 11 further executes processing of displaying, in the above-described third color, the constituent pixel of the sample image 60 corresponding to the constituent pixel of the first image data in which the pixel value that is the intensity gradation value cannot be expressed with the length of 16 bits and has overflowed. Therefore, the computer 10 further acquires, from the optical device 100, an overflow detection signal output from the AD converter 113 that samples the intensity signal output from the PPD 111. The processor 11 executes processing of specifying a target constituent pixel in the sample image 60 based on the overflow detection signal and a scanning position of the scanner corresponding to the detection signal, and displaying the specified constituent pixel in the third color.

FIG. 6B illustrates a screen example when the output of the laser 107 is increased to increase the irradiation intensity of the laser light on the sample in a state in which the sample image 60 of FIG. 6A is obtained.

In FIG. 6B, in the screen example of FIG. 6A, a region of the sample image 60 including constituent pixels having the output gradation values represented by colors within a range of gradation from white to black in the luminance range bar 51 is represented as the first saturation region 61-1. This indicates that the irradiation intensity of the laser light on the sample is increased, and thus, the region has become a region including constituent pixels whose output gradation values are larger than the output gradation value indicated by the upper limit value indicator 52. Furthermore, in FIG. 6B, a second saturation region 61-2 in which constituent pixels are displayed in the third color appears. The second saturation region 61-2 is a region of the constituent pixel represented as the first saturation region 61-1 in FIG. 6A, and indicates that the intensity gradation value of the constituent pixel of the region has overflowed due to an increase in irradiation intensity of the laser light on the sample.

As described above, when the Hi-Lo button 42 is pressed by the click operation, the processor 11 that has acquired the click operation executes processing of uniformly setting the color of the constituent pixel of the second image data corresponding to the constituent pixel of the first image data whose pixel value exceeds the predetermined upper limit value to the first color. Furthermore, at this time, the processor 11 executes processing of uniformly setting the color of the constituent pixel of the second image data corresponding to the constituent pixel having the minimum pixel value in the first image data to the second color different from the first color.

Furthermore, at this time, the processor I1 executes processing of acquiring, from the optical device 100, a flag indicating that the intensity signal indicating the intensity of light exceeding a predetermined maximum value has been output from the PPD 11. The flag is, for example, a flag that is output from the AD converter 113 included in the optical device 100 and indicates occurrence of overflow in AD conversion. In response to the acquisition of the flag, the processor 11 further executes processing of uniformly setting the color of the constituent pixel of the second image data corresponding to the constituent pixel whose pixel value represents the intensity of light exceeding the maximum value in the first image data to the third color different from both the first and second colors.

Furthermore, at this time, the processor 11 executes processing of the color of the remaining constituent pixels of the second image data to a color (for example, gradation of a color different from any of the first, second, and third colors) corresponding to the output gradation value that is the pixel value, that is, a color indicated by the luminance range bar 51 representing the correspondence between the color and the output gradation value for the constituent pixel. Then, the processor 11 executes processing of causing the display device 20 to display the sample image 60 in the color set for each constituent pixel in this manner.

By displaying the third example of the display screen obtained as described above, it is possible to quickly and smoothly advance the adjustment operation for setting the irradiation intensity of the laser light on the sample at the time of normal observation within an appropriate range.

Also in a case where the click operation is performed on the Hi-Lo button 42 on the display screen of FIGS. 4A and 4C to bring the icon button into a pressed state, similar display processing is executed, and the luminance range bar 51 and the sample image 60 in the display forms similar to those of FIGS. 6A and 6B are displayed on the screen.

Note that the above-described embodiments illustrate specific examples for facilitating understanding of the invention, and the embodiments of the present invention are not limited thereto. The image processing system 1 can be variously modified and changed without departing from the scope of the claims.

For example, the above-described embodiment illustrates an example in which three LUTs 13-1, 13-2, and 13-3 are stored in the memory 12, but the number of LUTs may be any number as long as it is plural.

What is claimed is:

1. An image processing system comprising:
- a scanner;
- a pixelated photon detector (PPD);
- a memory in which a plurality of tables in which an intensity gradation value and an output gradation value are associated with each other are stored; and
- a processor configured to execute processing of:
  - generating first image data in which the intensity gradation value indicated by a light intensity signal output from the PPD is set as a pixel value of a constituent pixel, based on the light intensity signal and a scanning position of the scanner;
  - generating second image data in which the output gradation value is set as a pixel value of a constituent pixel by converting the first image data based on one table selected from the plurality of tables stored in the memory; and
  - causing a display to display an image represented by the second image data.

2. The image processing system according to claim 1, wherein
- the processor is configured to execute processing of acquiring an input for selecting one table from the plurality of tables, and
- the second image data is generated by converting the first image data based on the one table selected by the input.

3. The image processing system according to claim 1, wherein the processor is configured to execute processing of causing the display to display the image in which a color of a constituent pixel of the second image data corresponding to a constituent pixel of the first image data whose pixel value exceeds a predetermined upper limit value or a color of a constituent pixel of the second image data corresponding to a constituent pixel of the first image data whose pixel value is equal to or larger than the predetermined upper limit value is set to a first color different from a color of a pixel whose pixel value is equal to or smaller than the predetermined upper limit value or a pixel whose pixel value does not exceed the predetermined upper limit value.

4. The image processing system according to claim 3, wherein the processor is configured to execute processing of causing the display to display the image in which a color of a constituent pixel of the second image data corresponding to a constituent pixel of the first image data whose pixel value is equal to or smaller than a predetermined lower limit value is set to a second color that is different from the first color and is different from the color of the pixel whose pixel value does not exceed the predetermined upper limit value.

5. The image processing system according to claim 4, wherein the processor is configured to execute processing of:

acquiring a flag indicating that the light intensity signal indicating the intensity gradation value exceeding a predetermined maximum value is output from the PPD; and causing the display to display, in response to the acquisition of the flag, the image in which a color of a constituent pixel of the second image data corresponding to a constituent pixel of the first image data whose pixel value represents the intensity gradation value exceeding the maximum value is set to a third color that is different from both the first color and the second color and is different from the color of the pixel whose pixel value does not exceed the predetermined upper limit value.

6. The image processing system according to claim 5, wherein the processor is configured to execute processing of:

causing the display to display the image in which a color of a constituent pixel of the second image data is set to a color corresponding to a pixel value of the constituent pixel; and causing the display to display an indicator representing a correspondence between the color and the output gradation value for the constituent pixel of the image.

7. The image processing system according to claim 2, wherein the processor is configured to execute processing of causing the display to display the image in which a color of a constituent pixel of the second image data corresponding to a constituent pixel of the first image data whose pixel value exceeds a predetermined upper limit value or a color of a constituent pixel of the second image data corresponding to a constituent pixel of the first image data whose pixel value is equal to or larger than the predetermined upper limit value is set to a first color different from a color of a pixel whose pixel value is equal to or smaller than the predetermined upper limit value or a pixel whose pixel value does not exceed the predetermined upper limit value.

8. The image processing system according to claim 7, wherein the processor is configured to execute processing of causing the display to display the image in which a color of a constituent pixel of the second image data corresponding to a constituent pixel of the first image data whose pixel value is equal to or smaller than a predetermined lower limit value is set to a second color that is different from the first color and is different from the color of the pixel whose pixel value does not exceed the predetermined upper limit value.

9. The image processing system according to claim 8, wherein the processor is configured to execute processing of:

acquiring a flag indicating that the light intensity signal indicating the intensity gradation value exceeding a predetermined maximum value is output from the PPD; and causing the display to display, in response to the acquisition of the flag, the image in which a color of a constituent pixel of the second image data corresponding to a constituent pixel of the first image data whose pixel value represents the intensity gradation value exceeding the maximum value is set to a third color that is different from both the first color and the second color and is different from the color of the pixel whose pixel value does not exceed the predetermined upper limit value.

10. The image processing system according to claim 9, wherein the processor is configured to execute processing of:

causing the display to display the image in which a color of a constituent pixel of the second image data is set to a color corresponding to a pixel value of the constituent pixel; and causing the display to display an indicator representing a correspondence between the color and the output gradation value for the constituent pixel of the image.

11. The image processing system according to claim 1, wherein the processor is configured to execute processing of:

acquiring a flag indicating that the light intensity signal indicating the intensity gradation value exceeding a predetermined maximum value is output from the PPD; and causing the display to display, in response to the acquisition of the flag, the image in which a color of a constituent pixel of the second image data corresponding to a constituent pixel of the first image data whose pixel value represents the intensity gradation value exceeding the maximum value is set to a third color that is different from the color of the pixel whose pixel value does not exceed the predetermined upper limit value.

12. The image processing system according to claim 2, wherein the processor is configured to execute processing of:

acquiring a flag indicating that the light intensity signal indicating the intensity gradation value exceeding a predetermined maximum value is output from the PPD; and causing the display to display, in response to the acquisition of the flag, the image in which a color of a constituent pixel of the second image data corresponding to a constituent pixel of the first image data whose pixel value represents the intensity gradation value exceeding the maximum value is set to a third color that is different from the color of the pixel whose pixel value does not exceed the predetermined upper limit value.

13. An image processing method comprising:

generating first image data in which an intensity gradation value indicated by a light intensity signal output from a pixelated photon detector (PPD) is set as a pixel value of a constituent pixel, based on the light intensity signal and a scanning position of the scanner;

generating second image data in which an output gradation value is set as a pixel value of a constituent pixel by converting the first image data based on one table selected from a plurality of tables in which the intensity gradation value and the output gradation value are associated with each other, the plurality of tables being stored in a memory; and causing a display to display an image represented by the second image data.

14. The image processing method according to claim 13, further comprising acquiring an input for selecting one table from the plurality of tables, wherein the second image data is generated by converting the first image data based on the one table selected by the input.

15. The image processing method according to claim 14, further comprising causing the display to display the image in which a color of a constituent pixel of the second image data corresponding to a constituent pixel of the first image data whose pixel value exceeds a predetermined upper limit value or a color of a constituent pixel of the second image data corresponding to a constituent pixel of the first image data whose pixel value is equal to or larger than the predetermined upper limit value is set to a first color different from a color of a pixel whose pixel value is equal to or smaller than the predetermined upper limit value or a pixel whose pixel value does not exceed the predetermined upper limit value.

16. A non-transitory computer-readable medium storing software that causes a processor to execute processing including:

generating first image data in which an intensity gradation value indicated by a light intensity signal output from a pixelated photon detector (PPD) is set as a pixel value of a constituent pixel, based on the light intensity signal and a scanning position of the scanner;

generating second image data in which an output gradation value is set as a pixel value of a constituent pixel by converting the first image data based on one table selected from a plurality of tables in which the intensity gradation value and the output gradation value are associated with each other, the plurality of tables being stored in a memory; and causing a display to display an image represented by the second image data.

17. The non-transitory computer-readable medium according to claim 16, wherein the processing further includes acquiring an input for selecting one table from the plurality of tables, and the second image data is generated by converting the first image data based on the one table selected by the input.

* * * * *